(12) United States Patent
Campanelli et al.

(10) Patent No.: US 9,432,671 B2
(45) Date of Patent: Aug. 30, 2016

(54) METHOD AND APPARATUS FOR CLASSIFYING MACHINE PRINTED TEXT AND HANDWRITTEN TEXT

(71) Applicant: Xerox Corporation, Norwalk, CT (US)

(72) Inventors: Michael Robert Campanelli, Webster, NY (US); Safwan R. Wshah, Webster, NY (US); Yingbo Zhou, North Tonawanda, NY (US)

(73) Assignee: Xerox Corporation, Norwalk, CT (US)

( * ) Notice: Subject to any disclaimer, the term of this patent is extended or adjusted under 35 U.S.C. 154(b) by 232 days.

(21) Appl. No.: 14/284,592

(22) Filed: May 22, 2014

(65) Prior Publication Data

US 2015/0339543 A1 Nov. 26, 2015

(51) Int. Cl.
G06K 9/62 (2006.01)
H04N 19/136 (2014.01)
G06K 9/18 (2006.01)
G06K 9/00 (2006.01)

(52) U.S. Cl.
CPC ........ *H04N 19/136* (2014.11); *G06K 9/00456* (2013.01); *G06K 9/18* (2013.01)

(58) Field of Classification Search
None
See application file for complete search history.

(56) References Cited

U.S. PATENT DOCUMENTS

| | | | |
|---|---|---|---|
| 5,181,255 A | 1/1993 | Bloomberg | |
| 5,542,006 A * | 7/1996 | Shustorovich | G06K 9/32 382/156 |
| 5,570,435 A | 10/1996 | Bloomberg et al. | |
| 5,745,600 A * | 4/1998 | Chen | G06K 9/72 382/218 |
| 5,912,986 A * | 6/1999 | Shustorovich | G06K 9/32 382/156 |
| 6,321,232 B1 * | 11/2001 | Syeda-Mahmood | G06F 17/30259 |
| 6,940,617 B2 * | 9/2005 | Ma | G06K 9/6835 358/1.15 |
| 7,072,514 B1 | 7/2006 | Thouin | |
| 7,903,870 B1 * | 3/2011 | Budagavi | G06K 9/00228 382/117 |
| 8,224,092 B2 * | 7/2012 | Bressan | G06K 9/00859 382/177 |
| 8,295,610 B1 * | 10/2012 | Brunner | G06K 9/4614 382/190 |
| 8,731,300 B2 * | 5/2014 | Rodriguez Serrano | G06K 9/6297 382/156 |
| 2002/0102024 A1 * | 8/2002 | Jones | G06K 9/6256 382/225 |
| 2007/0065003 A1 * | 3/2007 | Kellerman | G06K 9/00422 382/159 |
| 2008/0063285 A1 * | 3/2008 | Porikli | G06K 9/00369 382/190 |

(Continued)

OTHER PUBLICATIONS

End-to-End text recognition—Neural Networks, David J Wu., May 2012, pp. 1-60.*

(Continued)

*Primary Examiner* — Jayesh A Patel

(57) ABSTRACT

A method, non-transitory computer readable medium, and apparatus for classifying machine printed text and handwritten text in an input are disclosed. For example, the method defines a perspective for an auto-encoder, receives the input for the auto-encoder, wherein the input comprises a document comprising the machine printed text and the handwritten text, performs an encoding on the input using an auto-encoder to generate a classifier, applies the classifier on the input and generates an output that separates the machine printed text and the handwritten text in the input based on the classifier in accordance with the perspective.

18 Claims, 4 Drawing Sheets

(56) References Cited

U.S. PATENT DOCUMENTS

| | | | |
|---|---|---|---|
| 2008/0095442 A1* | 4/2008 | Ekin | G06K 9/325 382/187 |
| 2008/0304714 A1* | 12/2008 | Lu | G06K 9/00228 382/118 |
| 2009/0060335 A1* | 3/2009 | Rodriguez Serrano | G06K 9/00194 382/177 |
| 2009/0220156 A1* | 9/2009 | Ito | G06K 9/00248 382/201 |
| 2010/0226532 A1* | 9/2010 | Hayasaka | G06K 9/6203 382/103 |
| 2011/0158544 A1* | 6/2011 | Hashiguchi | G06K 9/4647 382/201 |
| 2011/0243376 A1* | 10/2011 | Luke | G06K 9/3241 382/103 |
| 2013/0243329 A1* | 9/2013 | Oro Garcia | G06K 9/00973 382/195 |
| 2014/0133742 A1* | 5/2014 | Xiao | G06K 9/00664 382/159 |
| 2014/0247993 A1* | 9/2014 | Lin | G06K 9/00281 382/195 |

OTHER PUBLICATIONS

Handwritten—Classifier, Malakar et al., Elsevier, 10.1016/j.protcy, 2013, pp. 831-839.*

* cited by examiner

METHOD AND APPARATUS FOR CLASSIFYING MACHINE PRINTED TEXT AND HANDWRITTEN TEXT

The present disclosure relates generally to processing forms and documents and, more particularly, to a method and apparatus for classifying machine printed text and handwritten text.

BACKGROUND

Automatically processing documents and forms requires machine printed text to be separated from handwritten text so the document can be prepped for scanning. The text is separated such that an optical character recognition (OCR) or an intelligent character recognition (ICR) can correctly capture and interpret the text.

Previous methods for performing separation of machine printed text from handwritten text were done on either clearly isolated documents or at a patch level. This would make it difficult to apply more general document images where both machine printed text and handwritten text could be potentially overlapping. Alternatively, a pixel-level separation would be necessary for reasonable OCR performance.

Another method uses Markov random fields (MRF) to do text separation on targeted documents that are highly imbalanced in terms of machine printed text versus handwritten text. The major heuristic is that the handwritten text appears as annotations so using MRF can effectively smooth large regions of machine printed text unless the evidence of handwriting text is very strong. The assumption is restrictive since not all documents contain handwriting text as annotations.

SUMMARY

According to aspects illustrated herein, there are provided a method, a non-transitory computer readable medium, and an apparatus for classifying machine printed text and handwritten text in an input. One disclosed feature of the embodiments is a method that defines a perspective for an auto-encoder, receives the input for the auto-encoder, wherein the input comprises a document comprising the machine printed text and the handwritten text, performs an encoding on the input using an auto-encoder to generate a classifier, applies the classifier on the input and generates an output that separates the machine printed text and the handwritten text in the input based on the classifier in accordance with the perspective.

Another disclosed feature of the embodiments is a non-transitory computer-readable medium having stored thereon a plurality of instructions, the plurality of instructions including instructions which, when executed by a processor, cause the processor to perform an operation that defines a perspective for an auto-encoder, receives the input for the auto-encoder, wherein the input comprises a document comprising the machine printed text and the handwritten text, performs an encoding on the input using an auto-encoder to generate a classifier, applies the classifier on the input and generates an output that separates the machine printed text and the handwritten text in the input based on the classifier in accordance with the perspective.

Another disclosed feature of the embodiments is an apparatus comprising a processor and a computer readable medium storing a plurality of instructions which, when executed by the processor, cause the processor to perform an operation that defines a perspective for an auto-encoder, receives the input for the auto-encoder, wherein the input comprises a document comprising the machine printed text and the handwritten text, performs an encoding on the input using an auto-encoder to generate a classifier, applies the classifier on the input and generates an output that separates the machine printed text and the handwritten text in the input based on the classifier in accordance with the perspective.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for classifying machine printed text and handwritten text in an input. As discussed above, automatically processing documents and forms requires machine printed text to be separated from handwritten text so the document can be prepped for scanning. Manually creating a general model that uses a set of rules or characteristics to accurately classify text as either machine printed text or handwritten text is very difficult.

Previous methods for performing separation of machine printed text from handwritten text were done on either clearly isolated documents or at a patch level. This would make it difficult to apply more general document images where both machine printed text and handwritten text could be potentially overlapping. Alternatively, a pixel-level separation would be necessary for reasonable OCR performance.

Another method uses Markov random fields (MRF) to do text separation on targeted documents that are highly imbalanced in terms of machine printed text versus handwritten text. The major heuristic is that the handwritten text appears as annotations so using MRF can effectively smooth large regions of machine printed text unless the evidence of handwriting text is very strong. The assumption is restrictive since not all documents contain handwriting text as annotations.

One embodiment of the present disclosure leverages a neural network or deep learning machine to automatically encode and classify machine printed text and handwritten texts in a document without any previous modeling or a priori knowledge about the document or how much of a mixture of machine printed text and handwritten text is contained in the document. A backward propagation algorithm is applied to the document to perform encoding. The auto-encoders may be used to generate a classifier, which may then be applied to classify text within the document as either a machine printed text or a handwritten text.

Figure 1:
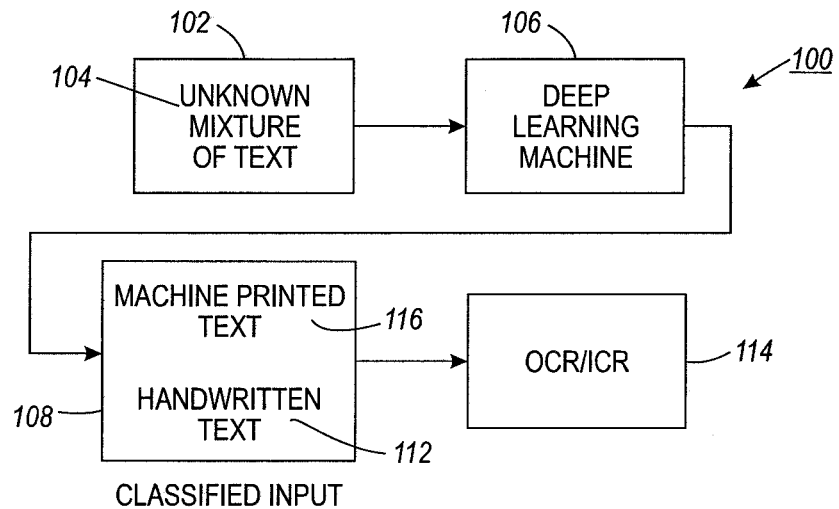
FIG. 1 illustrates an example block diagram of a system of the present disclosure.

FIG. 1 illustrates an example system 100 of the present disclosure. In one embodiment, the system 100 may include an input 102, a deep learning machine 106, an output or a classified input 108 and an optical character recognition (OCR) reader or intelligent character recognition (ICR) reader 114. In one embodiment, the input 102 may be a document that has an unknown mixture of text 104. For example, the document may be a form that contains machine printed text and handwritten text. In one embodiment, the machine printed text may be defined as any text within the document that was generated by a computer, printer, multi-function device (MFD), scanner, and the like. For example, the machine printed text has a well defined and consistent pixel pattern for each font and size of text. In one embodiment, the handwritten text may be defined as any text entered in the document by hand or by a human user.

As noted above, previous classification methods required that a certain amount of information be known about the document before applying the classification. For example, previous classification methods required the handwritten text to be annotations and include only a small amount of handwritten text compared to machine printed text. Other methods required a comprehensive training model to be generated based on annotated documents that were manually classified as machine printed text or handwritten text. In contrast, the present disclosure does not require any knowledge about the mixture of machine printed text and handwritten text, does not require any particular amount of machine printed text compared to handwritten text and does not require any training models to be developed by manual annotation.

In one embodiment, the deep learning machine 106 may be a hardware machine or device including a processor and computer readable memory. In one embodiment, the deep learning machine 106 may be deployed as a general purpose computer illustrated in FIG. 5 and discussed below.

The deep learning machine 106 may encode the input 102 and generate classifiers that can be applied to the input 102. The deep learning machine 106 may then generate a classified input or output 108 that classifies the machine printed text 116 and the handwritten text 112 in the input 102. The output 108 may then be forwarded to the OCR/ICR reader 114 for automatic processing (e.g., scanning and reading the text using an appropriate character reader based on machine printed text or handwritten text).

In one embodiment, the deep learning machine 106 may include a plurality of different processing layers. In one embodiment, the processing layers may include an input layer 202, an auto-encoder layer 204, a classifier layer 206 and an output layer or layers 208, and optionally 210. For example, based on a selected perspective that defines how the deep learning machine 106 will process the input 102, the deep learning machine 106 may have a single output layer 208 or two output layers 208 and 210.

In one embodiment, the input layer 202 may receive the input 102 and extract the connected components from the input 102. In one embodiment, the input 102 may be a standard form document with many horizontal and vertical lines. Thus, the horizontal and vertical lines may be removed to ensure that the proper connected components are analyzed for text classification.

In one embodiment, a sliding window approach may be applied to divide the components within the input 102 into a small window of a fixed size. For example, the components may be first divided into horizontal slices with a same height. Then, each one of the horizontal slices may be decomposed into vertical windows of the same width. Text contents within the small windows may have a value of one and the background may be set to zero.

Figure 3:
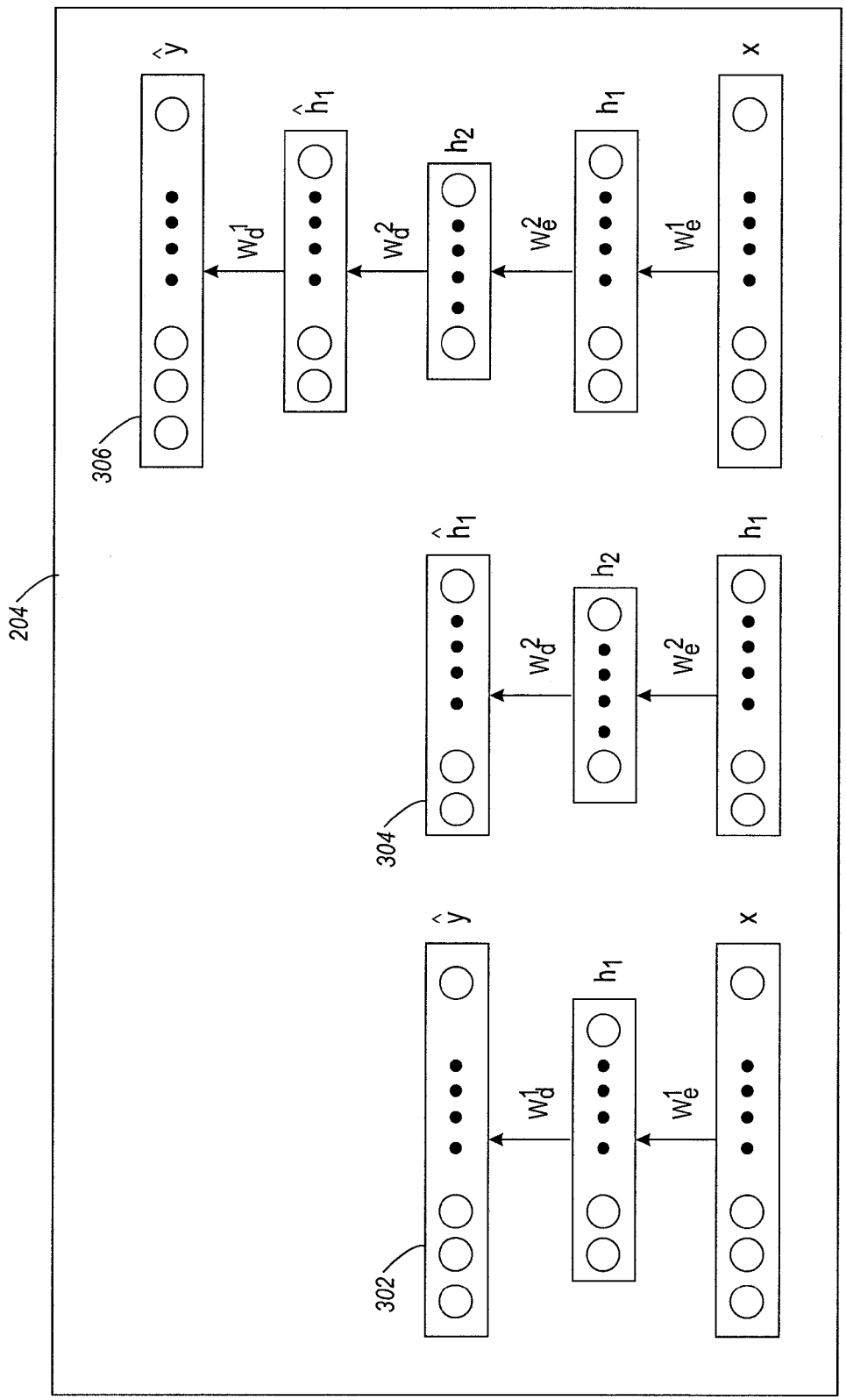
FIG. 3 illustrates an example of a backward propagation algorithm applied to an auto-encoder and how to stack several auto-encoders to form a deep learning machine.

In one embodiment, the auto encoder may be considered a one-hidden-layer neural network and its objective is to reconstruct the input 102 using its hidden representations or activations (h) so that the reconstruction error is as small as possible. The auto-encoder takes the input 102 and puts the input 102 through an encoding function to get the encoding of the input 102 and then the auto-encoder decodes the encoding through a decoding function to recover an approximation of the original input 102. In one embodiment, the auto-encoder layer 204 may apply a backward propagation algorithm to perform the above process and to generate the classifiers in the classifier layer 206. FIG. 3 illustrates an example of how the auto-encoder operates or processes the input 102.

For example, in FIG. 3 x represents an input and ŷ represents a reconstruction of the input x. In a first iteration 302, the input x may be auto-encoded with a first encoder weight $W_e^1$ to generate a first hidden representation $h_1$. Then the first hidden representation $h_1$ may be auto-decoded with a first decoder weight $W_d^1$ to generate ŷ. In a second iteration, 304, the input may be the first hidden representation $h_1$ and $h_1$ may be encoded with a second encoder weight $W_e^2$ to generate a second hidden representation $h_2$. The second hidden representation $h_2$ may be auto-decoded with a second decoder weight $W_d^2$ to generate $\overline{h_1}$, wherein $\overline{h_1}$ represents a reconstruction of the first hidden representation $h_1$.

In one embodiment, the above process may be referred to as "pre-training" and the process may be repeated until a desired number of layers are reached (e.g., the next iteration would use $h_2$ as the input to generate a third auto encoder and decoder and a third reconstruction of $\overline{h_2}$, and so forth) to tune the auto encoder layer 204.

The full network can be unfolded and further trained using the backward propagation algorithm. The number of hidden layers for the final network may be two times the number of auto-encoders. Using an example of two iterations or layers for the backward propagation algorithm illustrated in FIG. 3, a full network 306 may be unfolded on the input x to generate ŷ using the first and second encoder weights $W_e^1$ and $W_e^2$, the first and second decoder weights $W_d^1$ and $W_d^2$, the first and second hidden representations $h_1$ and $h_2$ and the reconstruction of the first hidden representation $\overline{h_1}$. In other words, each one of the plurality of encoders and each one of the plurality of decoders may be applied on the input.

Referring back to FIG. 2, the auto-encoder may be used to generate the classifier layer 206. The classifier layer 206 may be used to classify each text as machine printed text or handwritten text. In one embodiment, the labels may be applied to each location of the sliding window as it moves along within the input 102. This process may be repeated until all the contents within the input 102 have been classified as a machine printed text or a handwritten text. In other words, each location of the sliding window as it moves along the input 102 that is classified may be labeled as a machine printed text or a handwritten text.

The deep learning machine 106 may then generate a single output layer 208 or two output layers 208 and 210 depending on a perspective that is selected for the auto-encoder. In one embodiment, the perspectives may include an inpainting perspective or a classification perspective. In one embodiment, the inpainting perspective may require generating a separate classification model within the deep learning machine 106 for the machine printed text and the handwritten text, thus, creating two output layers 208 and 210. In one embodiment, the classification perspective may only generate a single output layer 208.

In one embodiment, the inpainting perspective may be defined as follows. Let $x \in \mathbb{R}^d$ be the input. Equations (1) and (2) may be defined as follows:

$$h = f_e(x) = s_e(W_e x + b_e),\qquad\text{Equation (1):}$$

$$\hat{x} = f_d(x) = s_d(W_d x + b_d),\qquad\text{Equation (2):}$$

where $f_e: \mathbb{R}^d \to \mathbb{R}^h$ and $f_d: \mathbb{R}^h \to \mathbb{R}^d$ are encoding and decoding functions respectively, $W_e$ and $W_d$ are the weights of the encoding and decoding layers, and $b_e$ and $b_d$ are the biases for the two layers, $S_e$ and $S_d$ are non-linear functions in general, h is a hidden representation and $\hat{x}$ is the reconstruction of the actual input x and common choices are sigmoidal functions like tan h or logistic.

In one embodiment, a set of parameters $\theta = \{W_e, W_d, b_e, b_d\}$ that minimize the reconstruction error may be found for training. The parameters may be found in accordance with Equation (3) below:

$$\mathcal{J}_{AE}(\theta) = \sum_{x \in \mathcal{D}} \mathcal{L}(x, \hat{x}),\qquad\text{Equation (3):}$$

where $\mathcal{L}: \mathbb{R}^d \times \mathbb{R}^d \to \mathbb{R}$ is a loss function that measures the error between the reconstructed input with the actual input x and the reconstruction $\hat{x}$, and $\mathcal{D}$ denotes the training dataset. The limitation of this approach is if h is set to be greater than d, the model can perform very well by trivially copying the inputs 102 to the hidden representations and then copying it back. Thus, normally h is set to be less than d to force the model to produce a meaningful result.

In problems with high variability such as handwritten text instead of getting lower dimensional representation of the data, there may be more interest to get over-complete representations so that a rich description of the inputs can be obtained. One method to achieve this would be by a denoising auto-encoder. The idea is to corrupt the input before passing the input to the auto-encoder, but still ask the model to reconstruct the un-corrupted input. In this way, the model is forced to learn representations that are useful so that it can reconstruct the original input. Formally, let $x_c \sim q(x_c | x)$ where $x_c$ is the corrupted input from the original input x where $q(.|X)$ is some corruption process over the input x, then the objective is to optimize the model as follows using Equation (4):

$$\mathcal{J}_{DAE}(\theta) = \sum_{x \in \mathcal{D}} \mathbb{E}_{q(x_c|x)}[\mathcal{L}(X, f_d \circ f_e(x_c))].\qquad\text{Equation (4):}$$

One way to look at the classification or separation problem is to get a strong prior model for the text type of interest. For example, if a prior model for handwritten text can be obtained, then for all inputs the confidence (probability) of the inputs being handwritten content can be predicted. The advantage of this model is that it is totally unsupervised, as long as the targeted data (e.g., pure handwritten data) is provided the model can be obtained. The disadvantage is that since the two contents that are being sought have similarities, the learned prior may not be strong enough to distinguish the two. For instance, the handwritten characters can be very similar to the machine-printed one depending on the writer's handwriting style; on the other hand, due to the font used or data corruption during data acquisition, machine-printed characters can also look like handwritten ones. In addition, the input at test time will be quite different from the input at training and, therefore, it is hard for the model to get reasonable outputs. Instead of learning the prior of the targeted class, a model can also be trained to deterministically filter out the irrelevant contents given mixed inputs. In this way, the model is forced to learn the difference among classes. The formulation is similar to the denoising auto-encoder in Equation (4) with a minor change as shown in Equation (5):

$$\mathcal{J}_{DAE}(\theta) = \sum_{x \in \mathcal{D}} \mathbb{E}_{q(x_c|x)}[\mathcal{L}(y, f_d \circ f_e(x_c))],\qquad\text{Equation (5):}$$

where x is the mixed input and y is the desired output. For example, if the handwriting contents are to be recovered, then y will be the handwriting contents from the mixed input x. However, this seemingly minor change made it a supervised model, which may restrict its applicability in situations where obtaining labeled data is expensive. In one embodiment, the Equations (1)-(5) may be used to generate the model for both the machine printed text and the handwritten text to generate the two output layers 208 and 210.

Figure 2:
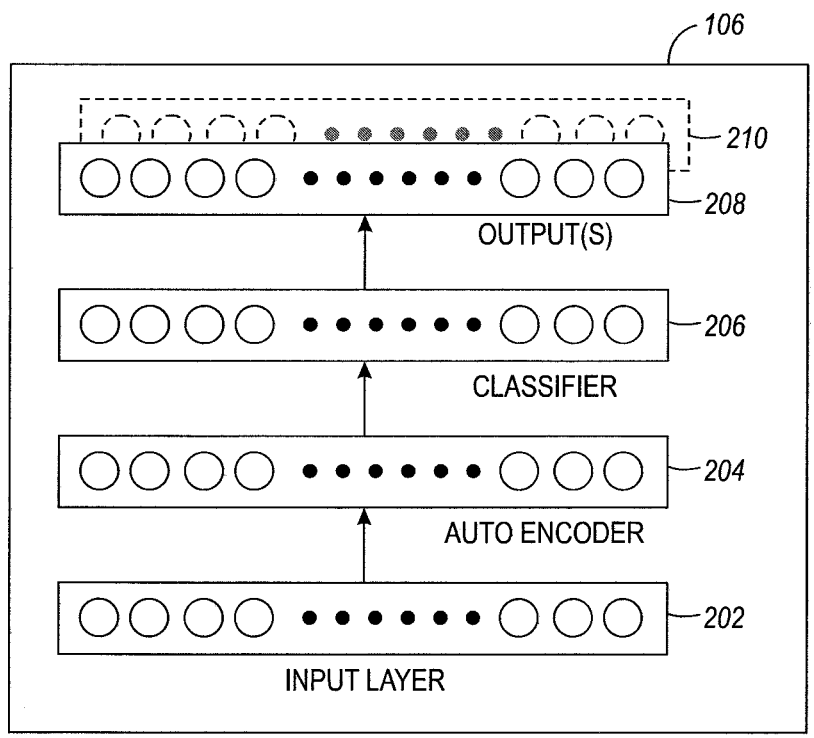
FIG. 2 illustrates a block diagram of an example deep learning machine for classifying machine printed text and handwritten text.

In one embodiment, the classification perspective may be obtained by modifying the inpainting perspective to change the output units to softmax units. For example, the function for the classification perspective may be defined by Equation (6):

$$f_d(x) = \frac{\exp(x^{[l]})}{\sum_{i=1}^{K} \exp(x^{[i]})},\qquad\text{Equation (6)}$$

where x now is represented using 1-of-K representation and $x^{[l]}$ denotes the $l^{th}$ class, wherein the class includes machine printed text and handwritten text. The structure of this network is shown in FIG. 2. As noted above, the model has been changed such that the output unit of the network has been changed to softmax and the target is converted to 1-of-K representation.

Figure 4:
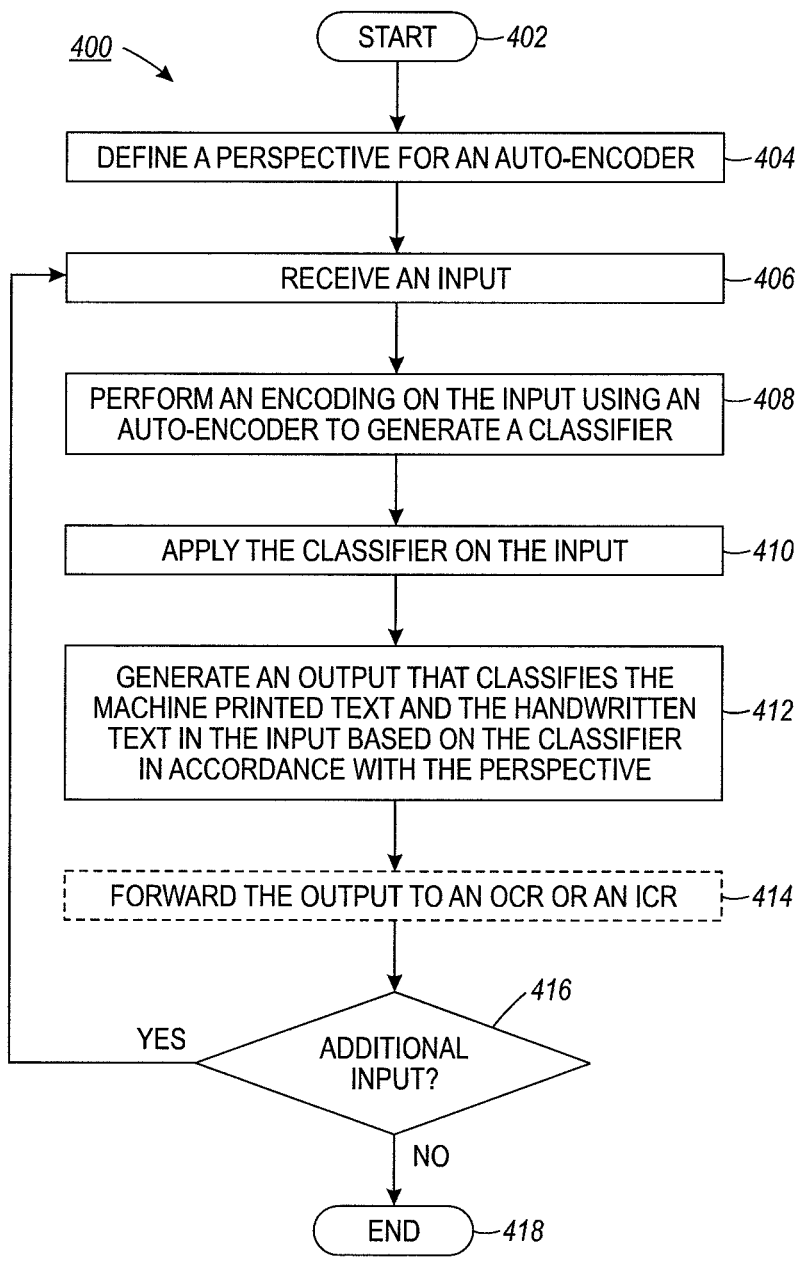
FIG. 4 illustrates an example flowchart of one embodiment of a method for classifying machine printed text and handwritten text in an input.
Figure 5:
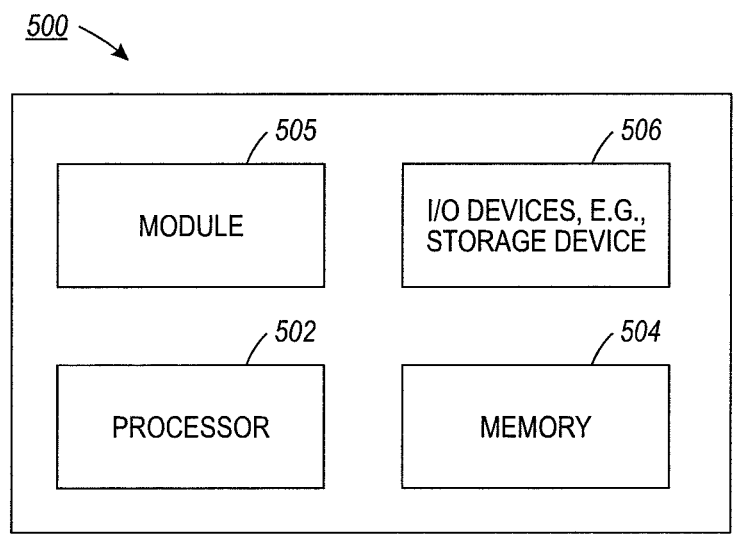
FIG. 5 illustrates a high-level block diagram of a general-purpose computer suitable for use in performing the functions described herein.

FIG. 4 illustrates a flowchart of a method 400 for classifying machine printed text and handwritten text in an input. In one embodiment, one or more steps or operations of the method 400 may be performed by the deep learning machine 106 or a general-purpose computer as illustrated in FIG. 5 and discussed below.

At step 402 the method 400 begins. At step 404, the method 400 defines a perspective for an auto-encoder. For example, the perspectives may include an inpainting perspective or a classification perspective. The number of outputs generated by the auto-encoder will depend on the perspective that is selected (e.g., two outputs for the inpainting perspective and one output for the classification perspective). The inpainting perspective is defined by Equations (1)-(5) above and the classification perspective is defined by Equation (6) above.

At step 406, the method 400 receives an input. In one embodiment, the input may be an electronic document or form that contains an unknown mixture of machine printed text and handwritten text. For example, no a priori knowledge about the input is required for the deep learning machine to auto-encode the input and generate classifiers to accurately classify the text in the input as either a machine printed text or a handwritten text. In addition, there is no requirement for a particular ratio of handwritten text to machine printed text. No training models with manually created rules attempting to characterize machine printed text and handwritten text need to be developed before the input is received by the deep learning machine.

In one embodiment, an input layer may receive the input and extract the connected components from the input. In one embodiment, the input may be a standard form document with many horizontal and vertical lines. Thus, the horizontal and vertical lines may be removed to ensure that the proper connected components are analyzed for text classification.

In one embodiment, a sliding window approach may be applied to divide the components within the input into a small window of a fixed size. For example, the components may be first divided into horizontal slices with a same height. Then, each one of the horizontal slices may be decomposed into vertical windows of the same width. Text contents within the small windows may have a value of one and the background may be set to zero.

At step 408, the method 400 performs an encoding on the input using auto-encoders to generate a classifier. For example, the auto-encoder may be considered a one-hidden-layer neural network and its objective is to reconstruct the input using its hidden representations or activations (h) so that the reconstruction error is as small as possible. The auto-encoder takes the input and puts the input through an encoding function get the encoding of the input and then the auto-encoder decodes the encoding through a decoding function to recover an approximation of the original input. In one embodiment, the auto-encoder layer may apply a backward propagation algorithm to perform the above process and to generate the classifiers in the classifier layer.

At step 410, the method 400 applies the classifier on the input. For example, once the classifiers are generated by the auto-encoding, the classifiers may be applied to the input to classify text within the input as either a machine printed text or a handwritten text.

At step 412, the method 400 generates an output that classifies the machine printed text and the handwritten text in the input based on the classifier in accordance with the perspective. For example, if the auto-encoder was defined using an inpainting perspective, the method 400 may generate two outputs (e.g., one output for the machine printed text model and another output for the handwritten text model). If the auto-encoder was defined using a classification perspective, the method 400 may generate a single output.

At optional step 414, the method 400 may forward the output to an OCR or an ICR reader. For example, once the input has all of the text classified as either machine printed text or handwritten text, the output or the classified input may be forwarded to an OCR or an ICR reader for accurate processing of the text.

At step 416, the method 400 may determine whether there are additional inputs to process. If there are additional inputs to process, the method 400 may return to step 406 to receive the next input (e.g., another document or form that requires classification of machine printed text and handwritten text within the document or form). If there are no additional inputs to process, the method 400 proceeds to step 418. At step 418, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for classifying machine printed text and handwritten text in an input, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for classifying machine printed text and handwritten text in an input (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for classifying machine printed text and handwritten text in an input (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for classifying a machine printed text and a handwritten text in an input, comprising:
    defining, by a processor, a perspective for an auto-encoder, wherein the perspective comprises an inpainting perspective, wherein the inpainting perspective is a function of a hidden representation of the input and a reconstruction of the input, wherein the hidden representation is based on an encoding function comprising a first non-linear function of an encoding layer weight of the input plus an encoding layer bias, wherein the reconstruction of the input is based on a decoding function comprising a second non-linear function of a decoding layer weight of the input plus a decoding layer bias;
    receiving, by the processor, the input for the auto-encoder, wherein the input comprises a document comprising the machine printed text and the handwritten text;
    performing, by the processor, an encoding on the input using an auto-encoder to generate a classifier;
    applying, by the processor, the classifier on the input; and
    generating, by the processor, an output that classifies the machine printed text and the handwritten text in the input based on the classifier in accordance with the perspective.

2. The method of claim 1, wherein the output comprises two different outputs.

3. The method of claim 1, wherein the perspective comprises a classification perspective that is a modification of the inpainting perspective that changes output units to softmax units.

4. The method of claim 3, wherein the output comprises a single output.

5. The method of claim 1, wherein the performing comprises using a backward propagation algorithm.

6. The method of claim 5, wherein the backward propagation algorithm comprises:
    performing, by the processor, the encoding on the input to generate a first encoder of a first hidden representation;
    performing, by the processor, a decoding on the first hidden representation to generate a first decoder of the first hidden representation;
    performing, by the processor, the encoding on the first hidden representation to generate a second encoder of a second hidden representation;
    performing, by the processor, the decoding on the second hidden representation to generate a second decoder of the second hidden representation;
    repeating, by the processor, each performing step of the backward propagation algorithm until a desired level of tuning is achieved comprising a plurality of encoders and a plurality of decoders; and
    applying, by the processor, each one of the plurality of encoders and each one of the plurality of decoders on the input.

7. The method of claim 1, wherein the applying the classifier on the input comprises using a sliding window on the input.

8. The method of claim 7, wherein the using the sliding window comprises:
    dividing, by the processor, the input into horizontal slices; and
    decomposing, by the processor, each one of the horizontal slices into vertical windows having a same width.

9. The method of claim 7, further comprising:
    applying, by the processor, the classifier to each location of the sliding window as either the machine printed text or the handwritten text;
    labeling, by the processor, the machine printed text or the handwritten text for the each location of the sliding window on the input; and
    forwarding, by the processor, the output that has the machine printed text and the handwritten text classified to an optical character reader or an intelligent character reader.

10. A non-transitory computer-readable medium storing a plurality of instructions which, when executed by a processor, cause the processor to perform operations for classifying a machine printed text and a handwritten text in an input, the operations comprising:
    defining a perspective for an auto-encoder, wherein the perspective comprises an inpaintinq perspective, wherein the inpainting perspective is a function of a hidden representation of the input and a reconstruction of the input, wherein the hidden representation is based on an encoding function comprising a first non-linear function of an encoding layer weight of the input plus an encoding layer bias, wherein the reconstruction of the input is based on a decoding function comprising a second non-linear function of a decoding layer weight of the input plus a decoding layer bias;
    receiving the input for the auto-encoder, wherein the input comprises a document comprising the machine printed text and the handwritten text;
    performing an encoding on the input using an auto-encoder to generate a classifier;
    applying the classifier on the input; and
    generating an output that classifies the machine printed text and the handwritten text in the input based on the classifier in accordance with the perspective.

11. The non-transitory computer-readable medium of claim 10, wherein the output comprises two different outputs.

12. The non-transitory computer-readable medium of claim 10, wherein the perspective comprises a classification perspective that is a modification of the inpaintinq perspective that changes output units to softmax units.

13. The non-transitory computer-readable medium of claim 12, wherein the output comprises a single output.

14. The non-transitory computer-readable medium of claim 10, wherein the performing comprises using a backward propagation algorithm.

15. The non-transitory computer-readable medium of claim 14, wherein the backward propagation algorithm comprises:
    performing the encoding on the input to generate a first encoder of a first hidden representation;
    performing a decoding on the first hidden representation to generate a first decoder of the first encoded input;

performing the encoding on the first hidden representation to generate a second encoder of a second hidden representation;

performing the decoding on the second hidden representation to generate a second decoder of the second hidden representation;

repeating each performing step of the backward propagation algorithm until a desired level of tuning is achieved comprising a plurality of encoders and a plurality of decoders; and applying each one of the plurality of encoders and each one of the plurality of decoders on the input.

16. The non-transitory computer-readable medium of claim 10, wherein the applying the classifier on the input comprises using a sliding window on the input.

17. The non-transitory computer-readable medium of claim 16, further comprising:

applying the classifier to each location of the sliding window as either the machine printed text or the handwritten text;

labeling the machine printed text or the handwritten text for the each location of the sliding window on the input; and forwarding the output that has the machine printed text and the handwritten text classified to an optical character reader or an intelligent character reader.

18. A method for classifying a machine printed text and a handwritten text in an input, comprising:

defining, by a processor, a perspective for an auto-encoder, wherein the perspective comprises an inpainting perspective that trains two models, the two models comprising a first model for the machine printed text and a second model for the handwritten text, wherein the inpaintinq perspective is a function of a hidden representation of the input and a reconstruction of the input, wherein the hidden representation is based on an encoding function comprising a first non-linear function of an encoding layer weight of the input plus an encoding layer bias, wherein the reconstruction of the input is based on a decoding function comprising a second non-linear function of a decoding layer weight of the input plus a decoding layer bias, or a classification perspective that trains a single model, wherein the classification perspective is a modification of the inpaintinq perspective that changes output units to softmax units;

receiving, by the processor, the input for the auto-encoder, wherein the input comprises a document comprising an unknown mixture of the machine printed text and the handwritten text, wherein the auto-encoder has not been previously trained with a training model;

performing, by the processor, an encoding on the input using an auto-encoder to generate a classifier via a sliding window approach;

applying, by the processor, the classifier on the input via the sliding window approach;

generating, by the processor, an output, wherein the output comprises either two outputs for the inpainting perspective or a single output for the classification perspective that classifies the machine printed text and the handwritten text in the input based on the classifier; and forwarding, by the processor, the output that has the machine printed text and the handwritten text classified to an optical character reader or an intelligent character reader.

* * * * *